United States Patent [19]

Lambert et al.

[11] 3,971,947

[45] July 27, 1976

[54] ULTRAVIOLET WATER PURIFIER

[76] Inventors: Douglas N. Lambert, 9451 Haitian Drive, Miami, Fla. 33157; Richard H. Bennett, 8731 SW. 125th St., Miami, Fla. 33156

[22] Filed: Dec. 19, 1974

[21] Appl. No.: 534,627

[52] U.S. Cl. .............................. 250/437; 21/102 R; 119/5; 250/438
[51] Int. Cl.² ............... G01N 21/24; G01N 21/26; A01K 63/00; A61L 3/00
[58] Field of Search ............. 250/432 R, 438, 435, 250/437; 21/102 R, DIG. 2; 119/5; 210/169

[56] References Cited
UNITED STATES PATENTS

| 1,193,143 | 8/1916 | Henri et al. ......................... 250/437 |
| 1,200,940 | 10/1916 | Henri et al. ......................... 250/437 |
| 2,669,661 | 2/1954 | Riddiford et al. .................... 250/438 |
| 2,844,727 | 7/1958 | Maciszewski et al. .............. 250/438 |
| 3,535,513 | 2/1967 | Cirami ............................... 21/102 R |

*Primary Examiner*—Alfred E. Smith
*Assistant Examiner*—T. N. Grigsby
*Attorney, Agent, or Firm*—Salvatore G. Militana

[57] ABSTRACT

An ultraviolet water purifier having a plurality of ultraviolet lamps mounted in a cover extending over the purifier and above the water in the purifier with a parabolic reflector directing the rays of the lamps toward the body of water. The purifier is provided with a water inlet and a baffle adjacent thereto having an opening at its base to compel the water entering the purifier to flow directly downwardly and then to flow through a plurality of filter. Air bubbles are trapped by a second baffle extending downwardly from the cover to below the water level. Before the water is discharged from the purifier, a third baffle which is positioned in approximately the center of the purifier and of lower height than the body of water compels the water to flow to the surface and over the third baffle to be discharged at the end of the purifier opposite that of the inlet thereby exposing the water to the rays of the ultraviolet lamps for a maximum period and at the position at which the rays are most effective as a germicide.

4 Claims, 4 Drawing Figures

ULTRAVIOLET WATER PURIFIER

BACKGROUND OF THE INVENTION

1. Field Of The Invention

This invention relates to water purifying devices for domestic uses, for aquariums, swimming pools and the like, and is more particularly directed to one which utilizes ultraviolet lamps for the germicidal effects thereof.

2. Description Of The Prior Art

The present water purifying devices that utilize ultraviolet lamps place the lamps in the water being purified so that as the water flows through the purifier, it passes in close proximity to the ultraviolet rays emanating from the lamps thereby rendering the lamps effective in its germicidal function. However, after a relatively short period of time, deposits from the water will form on the lamps and other foreign matter will adhere to the lamps to reduce the normal amount of ultraviolet rays that is able to leave the lamps and pass into the water. The longer the lamps remain in the water, the greater the amount of opaqueness is caused by the deposits and the less is the efficiency of the lamps to kill germs, etc. in the water. In addition, the ultraviolet lamps operate at maximum efficiency at 40° centigrade. Since the water being purified is normally a great deal lower in temperature than 40° centigrade, the efficiency of the lamps is reduced accordingly.

The present invention contemplates a water purifying device which avoids the above indication objections.

BRIEF SUMMARY OF THE INVENTION

Therefore, a principal object of the present invention is to provide a water purifying device for domestic uses, for swimming pools and aquariums in which ultraviolet lamps are in position above the body of water passing through the purifier with a parabolic reflector mounted about the lamps so that all of the ultraviolet rays are directed into the body of water and operate their maximum efficiency in their germicidal effect.

Another object of the present invention is to provide a water purifying device with ultraviolet lamps mounted above and exposed to water passing therethrough and the electrical equipment connected to the lamps are mounted in a water-tight compartment that covers the water purifying device and with baffle plates constructed to trap air bubbles and prevent them from coming into contact with the lamps.

A further object of the present invention is to provide a water purifying device with ultraviolet lamps extending above a body of water across approximately the full length of the device and a baffle plate at approximately the mid-portion thereof that compels the water to rise to the surface and flow over the baffle plate to receive the maximum germicidal effect of the lamps prior to being discharged into the aquarium as sterile water.

A still further object of the present invention is to provide an ultraviolet water purifying device for aquariums with a plurality of baffles and filters that compel the water as it enters the device to flow downwardly and then laterally through the screens with a depending flange extending downwardly below the surface of the water in the device to prevent any bubbles from coming into contact with ultraviolet lamps positioned above the water.

A still further object of the present invention is to provide a water purifying device for aquariums with a bracket arrangement which permits the device to be positioned over the top edge of varying thicknesses of a side wall of the aquarium.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DETAILED DESCRIPTION OF THE PREFERRED EMBODIMENT

Figure 1:
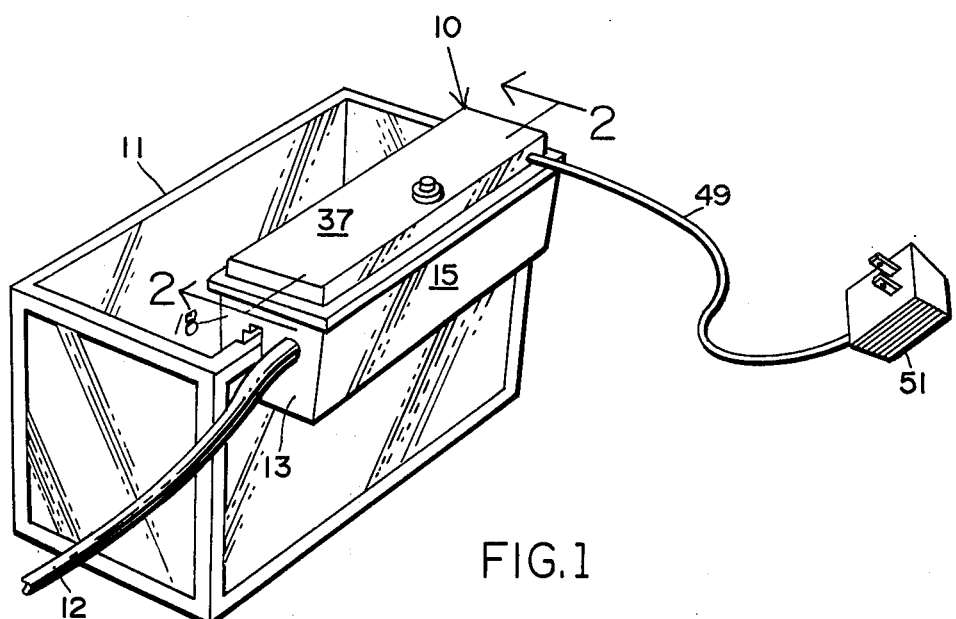
FIG. 1 is a perspective view of an aquarium utilizing an ultraviolet water purifier constructed in accordance with our invention.
Figure 2:
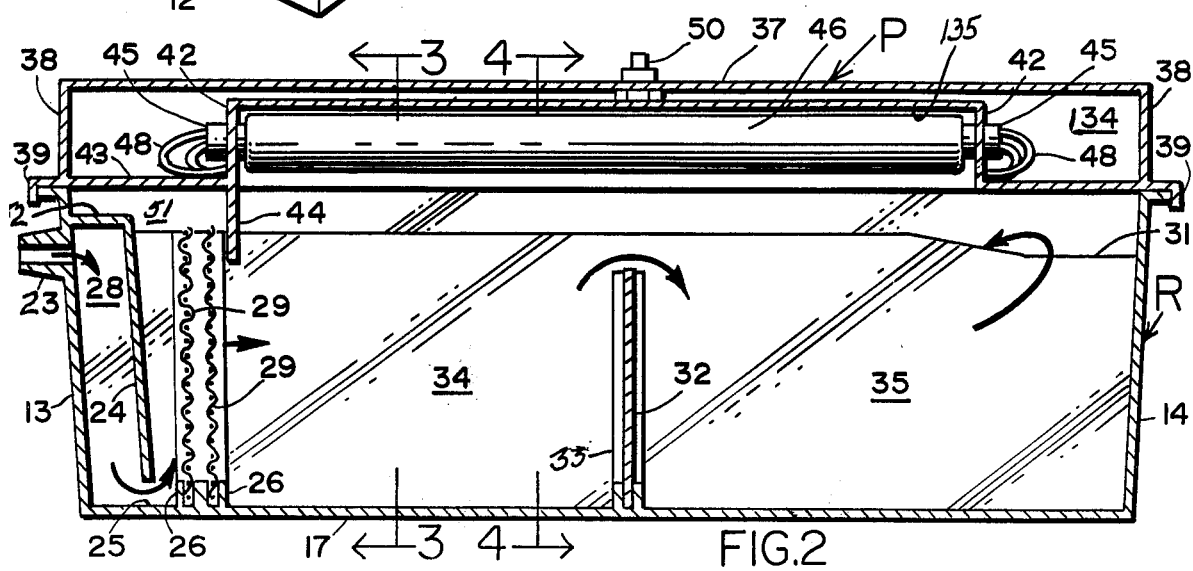
FIG. 2 is a longitudinal cross sectional view taken along the line 2—2 of FIG. 1.
Figure 3:
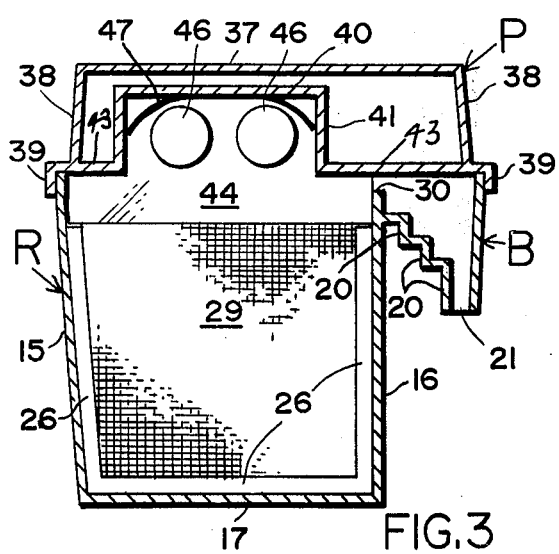
FIGS. 3 and 4 are transverse cross sectional views taken along the lines 3—3 and 4—4 respectively of FIG. 2.
Figure 4:
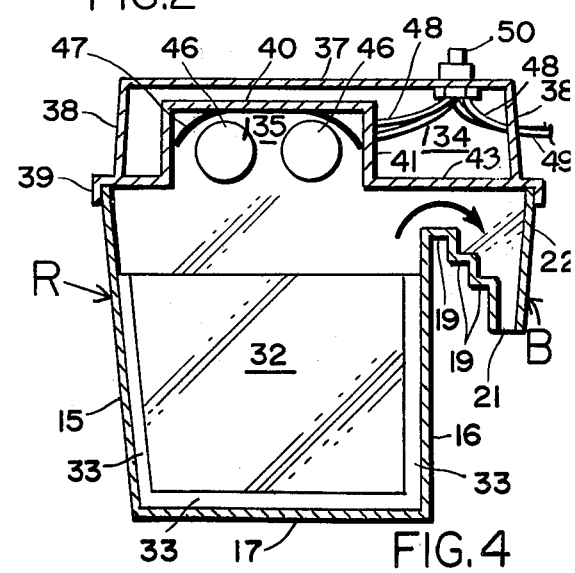

Referring to the drawing wherein like numerals are used to indicate similar parts throughout the several views, the numeral 10 refers to our ultraviolet water purifier shown mounted in position on a side wall of a conventional aquarium 11 having a hose 12 connected thereto that directs the flow of the aquarium water from a pump (not shown) which continuously recirculates the water, thereby maintaining the water in disease free condition as is explained in detail hereinafter.

The purifier 10 consists of a receptacle for containing and purifying the water that flows therethrough formed by end walls 13 and 14, side walls 15 and 16 and a bottom wall 17, the walls (except for wall 16) being joined at their edge portions to form an open receptacle. Mounted on the end wall 13 is a water inlet nipple 23 having a varying tapered outside diameter for receiving and accommodating water pipes 12 of varying sizes. Water entering the receptacle -R- is discharged through an opening 30 formed by the wall 16 terminating at a lower position than that of the walls 13, 14 and 15. In order to compel the water in the purifier 10 to flow through the full length of the receptacle -R- the wall 16 is formed at a lower height adjacent the end wall 14 as at 31. The end walls 13 and 14 are extended at their upper end portions on each side as at 18 to form a combined bracket -B- and discharge outlet 21. The wall portion 18 is stepped as at 19, 20 to form slotted portions of various widths for receiving the upper edge portion of a wall of the aquarium 11 for supporting the purifier 10 thereon, as shown by FIG. 1. A side wall 22 encloses the bracket -B- while the lowermost slot portion 21 is open to permit the discharge of water therethrough.

Mounted vertically in the receptacle -R- in proximity of the end wall 13 is a baffle plate 24 that extends to the side walls 15 and 16. Th baffle plate 24 extends upwardly to a horizontal wall 52 extending from the wall 13 above the inlet 23 and terminates short of the bottom wall 17 to form an enclosed chamber 28 with a discharge opening 25 along the bottom wall 17 for the water that enters the receptacle -R- at the inlet 23.

On each of the side walls 15 and 16 and bottom wall 17 are slotted members 26 for receiving therein screen panels 29 that are readily removed when it is desired to clean them of foreign matter entrapped thereon. At approximately the midportion of the receptacle -R- is a further plurality for slotted member 33 mounted on the walls 15, 16 and 17 for receiving a baffle plate 32 forming compartments 34 and 35, the plate 32 being of lower height than that of the wall 16 to compel all of the water to flow along the surface of the body of water from compartment 34 to compartment 35 prior to being discharged from the receptacle -R-.

Compelling the water in the receptacle -R- to flow along the surface of the body of water therein exposes the water for optimum effectiveness to our purifier device -P- consisting in general of superimposed housings to form a watertight chamber 134 therebetween and a second chamber 135 for containing ultraviolet lamps 46 whose rays are directed in the direction of the water in the aquarium receptacle -R-. The outer housing consists of a top wall 37 depending side walls 38 that extend to flanged portions 39 that rest on and engage the top edge portions of the walls 13-16 inclusive of the receptacle -R-.

Within the chamber 134 is the lamp chamber 135 formed by a top wall 40 in parallel and spaced relation to the top wall 37 with depending side walls 41 and end walls 42 that extend to a bottom wall 43. The bottom wall 43 is horizontally disposed extending to the flanged portions 39 to seal off the chamber 134 from the receptacle -R-, so that no moisture or water vapor can enter the chamber 134 in which the electrical equipment is contained. One of the end walls 42 nearest the screens 28 is provided with an extension baffle 44 that extends downwardly to below the surface of the water in receptacle -R- forming an air bubble trap chamber 51. The function of the baffle 44 is to inhibit the passage of water over the top of the screens 29, to trap air bubble that would otherwise splash water, etc. on the lamps 46. The water is compelled to pass through the screens 29 to filter out any particles of foreign matter therein and the bubbles trapped in the chamber 51 eventually return to the form of water, but upon breaking up, the bubbles cannot splash onto the lamps 46 to dirty them or to cause the lamps 46 to drop in temperature if the water is cooler than the lamps.

Mounted on both of the end walls 42 are fixtures 45 for receiving a pair of ultraviolet lamps 46 that extend approximately the full length of the chamber 35 with a parabolic reflector shield 47 mounted over the lamps 46 to reflect the rays discharged by the lamps 46 so that all of the rays of the lamps 46 are directed toward the body of water in the receptacle -R-. The fixtures 45 are connected by wires 48 that extend to a switch 50 mounted on the cover wall 37. The switch 50 in turn is connected to wires 49 that extend through an opening in the side wall 38 and connected at an appropriate transformer plug 51 which is normally connected to a source of electricity (not shown).

In the normal use of our aquarium water purifying device 10, the latter is positioned on the edge of an aquarium 11 with the top edge portion of the rear wall of the aquarium being received by any one of the slotted portions 19, 20 of the bracket -B- as determined by the thickness of the wall at the top edge portion. The discharge outlet 21 will then discharge the purified water that has passed through the purifying device 10 back into the aquarium 11. The pipe 12 which is normally connected to a pump will permit the water that is pumped from the aquarium 11 to discharge the water into the receptacle -R- into a chamber 28 formed by the baffle 24. This water is compelled to flow downwardly in the chamber 28 to leave the chamber 28 by the elongated opening 25 at the foot of the baffle 24. The water then flows into the chamber 34 after being passed through the pair of screens 29 which removed any particles or solid matter and air bubbles from the water. Also, any bubbles that may have been discharged into the chamber 28 will remain in the chamber or bubble trap 51 until broken up. If not then broken up, the bubbles will be dispersed by the filter screens 29 but in any event, there can be no splashing of water onto the lamps 46 that may be caused by the turbulence at the inlet 23 or by bubbles. It is the function of the baffles 24 and 44 to prevent any water from splashing into contact with the lamps 46. It is to be noted that water contacting the lamps 46 will deposit calcium and other matter present in the water on the lamps 46 to reduce the efficiency of the lamps. In our purifying device 10 no water will contact the lamps 46 so that the water germicidal effect is at its maximum at all times while in operation, and the optimum lamp temperature for maximum efficiency of the lamps is realized.

To assure that every particle of water that passes through the receptacle -R- is exposed to the ultraviolet rays emanating from the lamps 46, the water is compelled to surface by the baffle 32 when passing from the chamber 34 to the chamber 35. It is to be noted that the water in the chambers 34 and 35 is being purified by rays from the lamps 46, but the effectiveness of these germicidal rays is increased as to the water that is near the surface as compared to the water that would otherwise remain close to the bottom of the body of water. Consequently the baffle 32 which compels the water to rise to the surface as it flows from the chamber 34 to the chamber 35 assures the exposure of all the water in the aquarium system to those ultraviolet rays emanating from the lamps 46 at their most effective germicidal condition besides effecting a proper mixing of the water passing thereover. Obviously the germicidal effect of the ultraviolet rays is indirectly proportional to the depth of penetration in the water, and if the water is murky or dirty then the effectiveness of the ultraviolet rays is reduced even more.

It is to be noted that at no time can water flowing into the purifying device 10 spill or overflow except into the aquarium 11. In the event the screens 28 become clogged by foreign matter, or in the event the flow of water in the device 10 is greater than that can be cischarged along the discharge edge 31 of the side wall 16, the water will rise in the receptacle -R- and flow over the top edge of the wall 16 at the position of the chamber 51. The water will then flow through the bracket -B- and be discharged through the outlet 21 and into the aquarium 11.

Although our water purifying device 10 is shown and described in connection with the aquarium 11, it is to be noted that our water purifier can readily be used to purify water for domestic use such as for cooking, drinking, swimming pools and the like.

What we claim as new and desire to secure by Letters Patent is:

1. A water purifier comprising a receptacle comprising an inlet mounted at one side of said receptacle, outlet means compelling the flow of water along substantially the full length of said receptacle, an ultraviolet lamp, means mounting said ultraviolet lamp above said water and extending along said receptacle whereby water flowing therethrough is exposed to ultraviolet rays being emitted by said lamp, a depending baffle mounted adjacent said inlet in said receptacle and terminating in spaced relation to a bottom wall of said receptacle forming an opening and compelling water entering said receptacle to flow downwardly and be discharged through said opening, filtering means mounted in said receptacle adjacent to said depending baffle, a second depending baffle mounted adjacent to said filtering means and extending to below the surface of water positioned in said receptacle thereby forming a chamber above said filtering means for trapping bubbles entering said receptacle.

2. The structure as recited in claim 1 wherein said second depending baffle mounted in proximity of said inlet extends downwardly from said mounting means to below the level of said water whereby bubbles formed at inlet are prevented from contacting said lamp.

3. The structure as recited by claim 2 wherein said ultraviolet lamp mounting means comprising first cover means mounted over said receptacle with said lamp in exposed relation with water contained in said receptacle, second cover means mounted over said first cover means forming a watertight compartment for containing electrical connecting members for said lamp.

4. The structure as recited by claim 3 wherein said outlet means comprises substantially hollow bracket means mounted along substantially the full length of said receptacle for mounting said receptacle on an aquarium, an elongated opening along said full length of said receptacle communicating with said hollow bracket means, said opening tapering downwardly in proximity of a side of said receptacle opposite that of said one side whereby water is discharged from said receptacle to said aquarium.

* * * * *